United States Patent Office 2,854,114
Patented Sept. 30, 1958

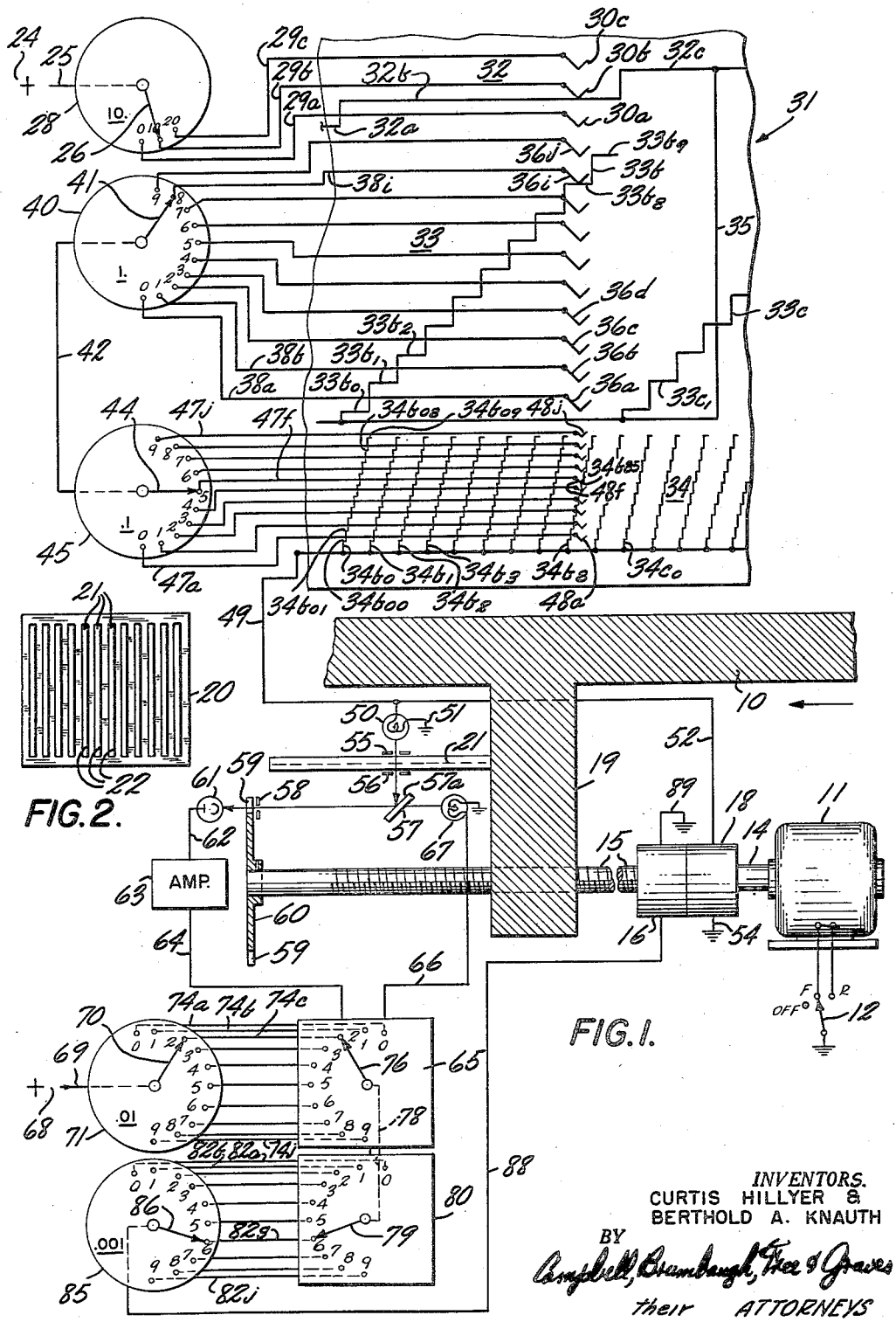

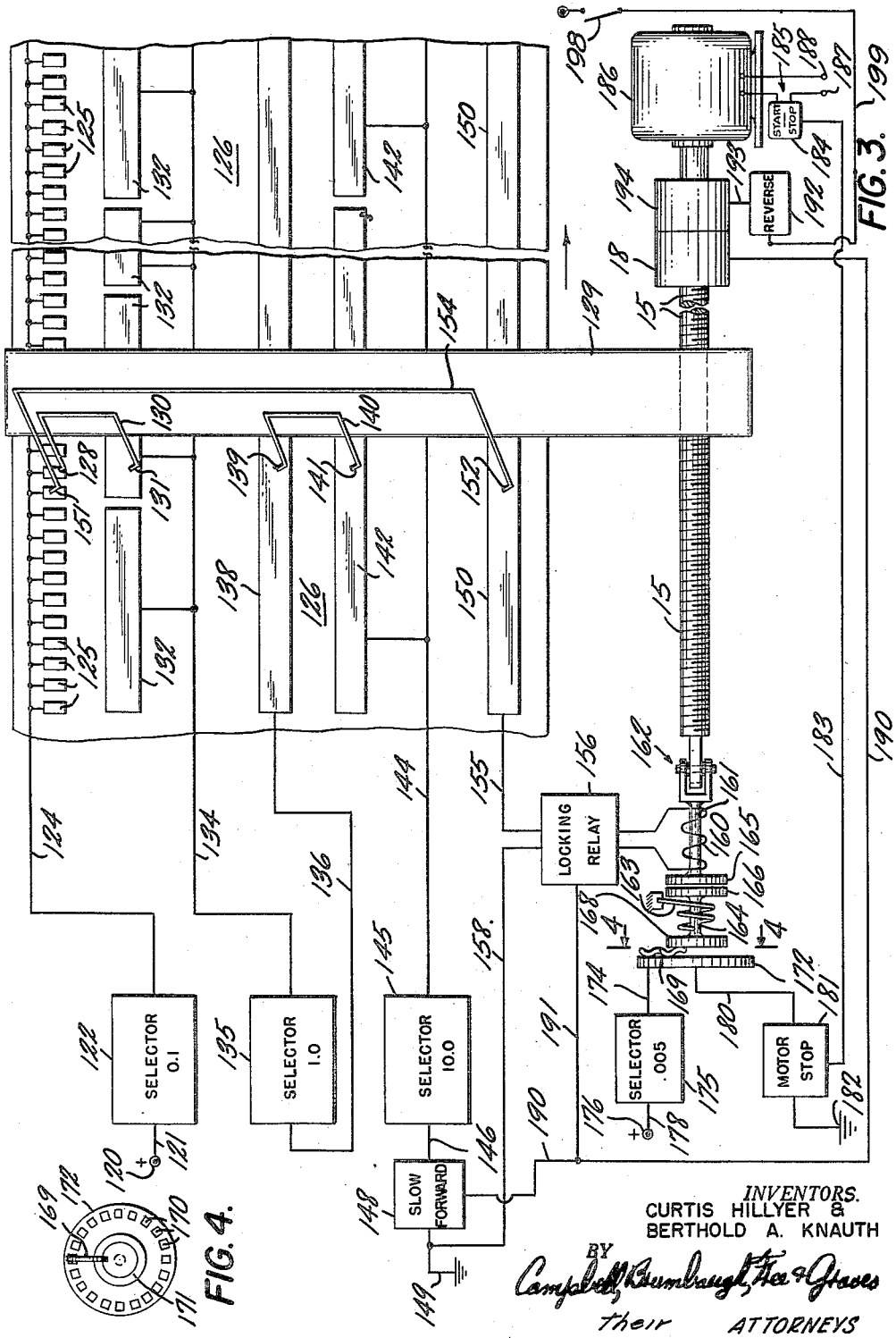

2,854,114

MECHANISM FOR MOVING WORK SUPPORT PRECISELY

Curtis Hillyer, Short Hills, N. J., and Berthold A. Knauth, High Falls, N. Y., assignors to Hillyer Instrument Company, Inc., New York, N. Y., a corporation of Delaware Continuation of application Serial No. 435,784, June 10, 1954. This application November 17, 1955, Serial No. 547,583

6 Claims. (Cl. 192—143)

The present invention relates to automatic precision control apparatus and, more particularly, to novel apparatuses for automatically controlling movement of an object through a predetermined distance.

This application is a continuation of application Serial No. 435,784, filed June 10, 1954, now abandoned.

In the manufacturing or assembling of articles, it is highly desirable to be able to automatically position the articles that are being worked on. For example, in the drilling or boring of a metallic block, it may be necessary to move the block a precise distance between successive drilling operations by a drill mounted in a fixed position, with a high degree of accuracy, e. g., on the order of a thousandth of an inch. In order to accomplish such an operation, the block would be fixedly positioned on a table or carrier, which in turn would be moved from position to position. Normally precision movement of this character requires the use of a complicated apparatus, wherein all of the component parts must be precisely made and accurately assembled. Therefore, the cost of such an apparatus is very high. Further, it is obvious that such an apparatus will not withstand the rigors of industrial use, since the precision parts would interact and become worn, thereby rapidly making the apparatus inaccurate.

It is an object of the invention, accordingly, to provide novel apparatuses which will overcome the aforementioned disadvantages.

Another object of the invention is to provide novel and useful apparatuses for automatically controlling the movement of an object in a precise manner, having precision elements which are inexpensive and easily producible.

These and other objects may be obtained, in accordance with the invention, by a floating reference means which may be attached to and moved with the table or carrier supporting the article which is being moved. This reference means functions in cooperation with an electro-mechanical control system. When the carrier or table has moved a major portion of a predetermined distance, a speed-changing means is actuated and the speed of movement is reduced. At this time, the table or carrier continues to move in the desired direction, but at the reduced speed. As this movement continues, the operation of further elements of the electro-mechanical control system is initiated to control the remaining portion of the desired movement.

For a complete understanding of the invention reference should be made to the following detailed description taken in conjunction with the accompanying drawings, in which:

Fig. 1 is a schematic diagram of an automatic precision control apparatus, in accordance with the invention;

Fig. 2 is a partial plan view of the top surface of a floating reference plate, in accordance with the invention, showing a plurality of parallel apertures or transparent slits;

Fig. 3 is a schematic diagram of an alternate embodiment of the invention; and

Fig. 4 is a view, taken along the line 4—4 in Fig. 3 and looking in the direction of the arrows, of another type of stationary contact plate.

Referring now to Fig. 1, there is shown a controlled element 10, which may be a movable table, carrier or other device, adapted to be moved with precision over a reasonable distance. The controlled element 10 may be driven by a reversible electric motor 11 having a reversing switch 12. The motor 11 may drive a shaft 14 which may be connected to a drive screw 15 by a conventional electrically controlled brake 16 and a conventional electrically controlled speed-changing clutch 18. The drive screw 15 may engage a depending portion 19 of the controlled element 10.

A floating reference plate 20 may be attached to the depending portion 19 of the controlled element 10 in any suitable manner. The floating reference plate 20 should be of a generally opaque nature having a plurality of parallel elongated transparent slits 21, as may be best seen in Fig. 2. For example, the reference plate 20 may be made of glass with an opaque coating printed thereon from a master plate. Further, the plate 20 may consist of one elongated plate or a series of contiguous plates. The slits 21 may be spaced-apart by a predetermined fixed distance, preferably 0.1 inch between the corresponding edges 22. This distance should be precisely established.

The control circuit may be as follows: A suitable source of electrical energy 24 may be connected by a conductor 25 to a movable contact arm 26 of a conventional decade selector switch 28 having a plurality of ten numbered contacts, for example, 0, 10 and 20, mounted thereon which may correspond to tens of inches. The contacts of the selector switch 28 may be connected individually by a group of conductors 29$a$, $b$ and $c$ to a group of brushes 30$a$, $b$ and $c$. The brushes 30$a$, $b$ and $c$ may be adapted to slide over the surface of a switch plate 31, which may be fixedly mounted on the controlled element 10, for example, on the underside of the controlled element. The switch plate 31 may take any suitable form. For example, it may have a printed circuit disposed thereon including a plurality of groups of interconnected stepped contacts 32, 33 and 34. The group of stepped contacts 32 may be connected to the group of stepped contacts 33 by a conductor 35.

The first group of stepped contacts 32 may include the interconnected stepped contacts 32$a$, $b$ and $c$ wherein each of the steps may be 10 inches in length and in alignment with the direction of movement of the controlled element 10. The second group of stepped contacts 33 may include a plurality of sub-groups 33$a$, $b$ and $c$ corresponding to the steps 32$a$, $b$ and $c$. Each of these sub-groups may be divided into a plurality of stepped contacts, for example 33$b_0$–$b_9$, having individual lengths of 1 inch extending in a direction parallel to that of the direction of movement of the controlled element 10. The third group of stepped contacts 34 may include a plurality of sub-groups 34$a$, $b$ and $c$, which in turn may consist of groups of ascending stepped contacts, for example, 34$b_0$–$b_9$ corresponding to the individual contact steps 33$b_0$–$b_9$. Each of the groups of ascending contacts may include a plurality of individual contacts, for example, the sub-group 34$b_0$ may include a plurality of ascending interconnected step contacts 34$b_{00}$–$b_{09}$, having individual lengths of 0.1 inch.

The switch plate 31 may be formed of any suitable non-conducting material upon which an electrically conductive printed circuit may be placed, for example, the plate may be glass with a printed circuit of silver ink or, on the other hand, the plate might be made of Bakelite with a printed circuit of copper etched thereon.

A second group of brushes 36a–j, inclusive, may be connected by a plurality of electrical conductors 38a–j, respectively, to a plurality of numbered contacts 0–9, inclusive, respectively mounted on a second conventional decade selector switch 40. The selector switch 40 may have a movable contact arm 41 adapted to engage the individual contacts 0–9, inclusive, which may correspond to inches. The movable contact arm 41 may be connected by a conductor 42 to a third movable contact arm 44 on a third decade selector switch 45. The movable contact arm 44 of the selector switch 45 may be adapted to contact the numbered contacts 0–9, inclusive, which correspond to tenths of an inch. These contacts may be connected by a plurality of conductors 47a–j, inclusive, to a group of brushes 48a–j, inclusive, respectively. These brushes, in turn, may be adapted individually to engage an appropriate one of the group of step contacts 34 on the switch plate 31.

The group of step contacts 34 may be connected by a conductor 49 through a lamp 50 to a ground or reference point 51. The conductor 49 may also be connected to a conductor 52, which may be connected through the speed-changing clutch 18 to a ground or reference point 54.

Light from the lamp 50 may be adapted to pass through a fixed slit 55, thence through the transparent slits 21 of the floating reference plate 20 and a second fixed slit 56 to a mirror 57, having a reflecting surface 57a. The mirror 57 may be of a conventional partially reflecting type wherein light impinging on one surface is partially reflected from that surface while light impinging on the opposite surface is partially transmitted through the mirror 57. The mirror may be disposed at an angle to the path of the light beam from the lamp 50 so as to direct the light beam at an angle to its original path. The light reflected from the mirror 57 may be projected through a third fixed slit 58 and the slots 59 in a suitable chopper plate 60 to a photoelectric cell 61, which may be of any conventional type.

The chopper plate 60 may be fixedly mounted on the end of the drive screw 15 and may be made of any suitable rigid and opaque material, such as metal or plastic. The slots 59 may be spaced in the periphery of the chopper disc. The exact spacing of the slots is not critical but in the preferred embodiment there should be 50 slots evenuly spaced-apart. As an alternative to the slots 59, a plurality of small apertures or transparent spots might be placed around the periphery of the chopper disc 60.

The photoelectric cell 61 may be connected by a conductor 62 to an amplifier 63, which in turn may be connected by a conductor 64 to any type of suitable counter means, for example, conventional stepping switches 65 and 80. A conductor 66 connects an auxiliary lamp 67 to an energizing circuit (not shown) within the stepping switch 65.

A conventional source of electrical energy 68 may be connected by the conductor 69 to a movable contact arm 70 of a fourth decade selector switch 71. The movable contact arm 70 may be adapted to contact the plurality of individual numbered contacts 0–9, inclusive, which correspond to hundredths of an inch. The numbered contacts, in turn, may be connected by a corresponding plurality of conductors 74a–j, inclusive, to a similar plurality of contacts in the stepping switch 65, which may be numbered 0–9, inclusive. The stepping switch 65 may have a movable contact arm 76 adapted to engage the individual numbered contacts. A conductor 78 may connect the movable contact arm 76 of the stepping switch 65 to a movable contact arm 79 of the stepping switch 80. The movable contact arm 79 may be adapted to engage a plurality of numbered contacts, 0–9, inclusive, which may be connected by a corresponding plurality of conductors 82a–j, inclusive, to a similar plurality of numbered contacts in a fifth decade selector switch 85, which may be similarly numbered 0–9, inclusive, corresponding to thousandths of an inch. A movable contact arm 86 may be adapted to engage the numbered contacts of the selector switch 85. The movable contact arm 86 may be also connected through a conductor 88 and the electrically controlled brake 16 to a ground or reference point 89.

In operation, if it is desired to move the controlled element 10 a predetermined distance of, for example, 18.526 inches, the five decade selector switches may be appropriately set for the tens, units, tenths, hundredths and thousandths digits, as shown in the exemplary embodiment of Fig. 1. Having made the required setting of the selector switches, it is only necessary to close the control switch 12 of the reversible electric motor 11, in either the forward or reverse position as desired, to initiate the operation of the device, in accordance with the invention.

When the electric motor 11 starts to operate, the controlled element 10 begins to move at a predetermined rate in the desired direction, for example, to the left as shown by the arrow in Fig. 1. As the controlled element 10 moves along, the switch plate 31 which is affixed thereto is maintained in engagement with the groups of brushes 30, 36 and 48. Assuming that the controlled element 10 starts from the zero position, after it moves a distance of 10 in., the brush 30b engages the step contact 32b of the printed circuit. The controlled element 10 continues to move in the desired direction at the predetermined speed. When the distance traversed has increased to 18 in., the brush 36i will engage the step $33b_8$ of the printed circuit. The above-mentioned engagements do not effect the operation of the precision controlling apparatus, but merely partially enable the energizing circuit for the lamp 50. However, as the distance traversed increases to 18.5 in., the brush 48f engages the step $34b_{85}$ of the printed circuit thereby completing the energizing circuit for the lamp 50.

Accordingly, the lamp 50 is energized from the source 24 through the conductor 25, the first movable contact arm 26, the numbered contact 10 of the tens decade selector 28, the conductor 29b, the brush 30b, the printed circuit step contact 32b, a portion of the group of interconnected stepped contacts 32 of the printed circuit intermediate the engaged step contact 32b and the conductor 35, the conductor 35, a portion of the groups of interconnected step contacts 33 intermediate the conductor 35 and the engaged step contact $33b_8$, the printed circuit step contact $33b_8$, the brush 36i, the conductor 38i, the numbered contact 8 of the units decade selector switch 40, the movable contact arm 41, the conductor 42, the movable contact arm 44, the numbered contact 5 of the tenths decade selector switch 45, the conductor 47f, the brush 48f, the printed circuit step contact $34b_{85}$, a portion of the group of interconnected stepped contacts 34 intermediate the engaged step contact $34b_{85}$ and the conductor 49, the conductor 49, and the lamp 50 to the ground 51. The electrically controlled speed-changing clutch 18 is also energized by the same circuit through the conductor 52 and the clutch 18 to the ground 54, so as to reduce the speed of movement of the controlled element 10 to a predetermined slow speed.

At the time when the lamp 50 is energized, the light beam from the lamp will first pass through the fixed slit 55 and impinge upon an opaque portion of the floating reference plate 20. Since the controlled element 10 is continuing to move in the desired direction, although at a slower speed, the floating reference plate 20 will move under the beam of light from the lamp 50 until the beam contacts the precision control edge 22 of one of the transparent slits 21. At that point, the beam of light will be allowed to pass through the transparent slit 21 and the second fixed slit 56 to the reflecting surface 57a of the mirror 57 from whence it is directed through the fixed slit 58 and one of the slots 59 in the periphery of the chopper disc 60 to impinge upon the photoelectric cell 61.

In the exemplary embodiment of Fig. 1, the drive screw 15 preferably may have 20 threads per inch and there may be 50 slots in the periphery of the chopper disc 60. Thus it will be apparent that the chopper disc 60 will tend to break the beam of light into 1000 discrete portions for each inch of travel of the controlled element. As a result of the impingement upon the photoelectric cell 61 of the discrete portions of light, corresponding electric current impulses are created. These current impulses are amplified by the amplifier 63 and fed to the stepping switches 65 and 80 to control their operation.

The first pulse that is fed to the stepping switches 65 and 80 also acts to energize the auxiliary lamp 67, which then remains on under the control of a suitable holding circuit (not shown). The energization of the auxiliary lamp 67 produces a beam of light which passes through the mirror 57, the fixed slit 58, and the slots 59 in the chopper disc 60 to impinge upon the collector plate of the photoelectric cell 61, in the same manner as the light beam from the lamp 50.

The light beam from the auxiliary light source 67 functions to maintain a continuous sequence of electrical pulses from the photoelectric cell 61 to the stepping switches 65 and 80, regardless of whether the beam of light from the lamp 50 passes through the floating reference plate 20 at any time subsequent to the initial passage of the beam.

The electrical pulses cause the stepping switch 80 to operate cyclically in a step-by-step manner through its ten contacts 0–9. Upon the completion of each individual cycle of the stepping switch 80, i. e., passing from the number 9 contact to the number 0 contact, the stepping switch 65 is actuated in a step-by-step manner so as to move the contact arm 76 to the next numbered contact.

When the movable contact arms 76 and 79 of the stepping switches 65 and 80, respectively, simultaneously engage with the desired contacts, as established by the setting of the selector switches 71 and 85, the electrically controlled brake 16 is operated. The brake 16 is energized from the source 68 through the conductor 69, the movable contact arm 70, the number 2 contact of the decade selector switch 71, the conductor 74c, the movable contact arm 76, the conductor 78, the movable contact arm 79, the conductor 82g, the movable contact arm 86, the conductor 88, the electrically controlled brake 16 to the ground 89. The energization of the brake 16 stops the movement of the drive screw 15 and thus the movement of the controlled element 10. It will be apparent that any time delay that may occur in the appplication of the electrically controlled brake 16 or other operations may be compensated by the adjustment of the transparent slits 21 of the floating reference plate 20.

It will be obvious to those skilled in the art that if the floating reference plate 20 has the leading edges 22 of the transparent slits 21, in each direction of travel, placed thereon with a high degree of precision, it will not be necessary to utilize a precision made drive screw or chopper disc. For example, if the slots 59 in the chopper disc 60 vary in width or spacing by 10% or 20%, the variation represents only an error of 10% or 20% of .001 in.

Thus it will be apparent that the above-disclosed precision control device provides for the automatic control of the movement of the controlled element or a predetermined distance with extreme precision and yet with a minimum of precision elements.

Referring now to Fig. 3, several of the elements therein disclosed bear the same reference numerals as the corresponding elements in the system of Fig. 1 and are connected in the same manner.

The control circuit may be as follows: A suitable source of electrical energy 120 may be connected by a conductor 121 to a conventional decade selector switch 122, which may be similar to the switches 28, 40 and 45 of Fig. 1, preferably having ten numbered contacts, 0–9, inclusive, corresponding to tenths of an inch. The contacts of the selector switch 122 may be connected individually by a conducting means 124 to parallel groups of contacts 125. The contacts 125 are uniformly spaced along a contact strip 126, which may be positioned adjacent to and parallel with the path through which the controlled element is moved. For example, the corresponding edges of each of the contacts 125 may preferably be spaced at intervals of 0.1 inch along the entire length of the contact strip 126, thereby defining each 0.1 of an inch through which the controlled element may be moved. The contact strip 126 may have the contacts 125 and the conducting means 124 formed thereon as a conventional printed circuit, or arranged in any other suitable manner. A brush contact 128 may be adapted to pass along the line of and make individual contact with each of the 0.1 inch contacts 125. The contact 128 may be mounted on a carrying member 129, which may be integral with or attached to some suitable part of the controlled element. Further, the contact 128 may be connected by a bridging conductor 130 to a brush contact 131, which may be adapted to pass over and make contact with a plurality of separate contacts 132 formed in the contact strip 126 in a line parallel to and coextensive with the 0.1 inch contacts 125.

Each of the contacts 132 may be coextensive in length with a group of 0.1 inch contacts 125 and have corresponding edges spaced at intervals of 1 inch. The 1.0 inch contacts 132 may be separated by equal intervals, which are equal to the interval between the 0.1 inch contacts 125 and coextensive with the interval between the 9 digit 0.1 inch contact 125 of one group of 0.1 inch contacts and the 0 digit 0.1 inch contact 125 of the next group.

The 1 inch contacts 132 may be arranged in groups of ten, in a manner similar to the 0.1 inch contacts 125, and be connected by conducting means 134 to appropriate contacts 0–9, inclusive, on a units digit decade selector switch 135, which may be of any conventional type.

The units digit decade selector switch 135 may be connected to a conductor 136 leading to a common bus or contact 138 on the contact strip 126, which may extend the full length of the path through which the carrying member 129 may be moved and be parallel to the 0.1 inch contacts 125 and the 1.0 inch contacts 132.

A brush contact 139 may be mounted on the carrying member 129 and be adapted to pass over the length of the common bus 138 and be in electrical contact with it. A bridging conductor 140 may connect the contact 139 to another brush contact 141, which may be adapted to pass over and make contact with any one of a plurality of contacts 142.

Each of the contacts 142 may be coextensive in length with a group of 1.0 inch contacts 132 and have corresponding edges spaced at intervals of 10 inches. The 10.0 inch contacts 142 may be separated by equal intervals, which are equal to the interval between the 0.1 inch contacts 125 and the 1.0 inch contacts 132, and coextensive with the interval between the 9 digit 1.0 inch contact 132 of one group of 1.0 inch contacts and the 0 digit 1.0 inch contact 132 of the next group. The 10.0 inch contacts 142 may be connected to appropriate 0–9 contacts on a conventional tens digit decade selector switch 145 by means of conducting means 144.

The tens selector switch 145 may in turn be connected by a conductor 146 through a Slow Forward control means 148 to a ground or reference point 149.

The contact strip 126, in addition to the contacts 125, 132, 138 and 142, may include a common bus bar or contact 150 coextensive in length and parallel to the common contact 138. Another pair of brush contacts 151 and 152 connected by a conductor 154 may be mounted on the carrying member 129. The brush contact 151 may be adapted to engage the 0.1 inch contacts 125 at a point rearward of the brush contact 128, the forward direction being designated as from left to right by means of the arrow in Fig. 3. The brush contact 152 may be adapted to pass over and engage the common contact 150.

The contact 150 may be connected by means of a conductor 155 to a locking relay means 156, which in turn may be connected by a conductor 158 to the ground or reference point 149. The locking relay 156 may be connected to solenoid control means 160 adapted to surround and control the axial displacement of a shaft 161. The shaft 161 may be coupled to the drive screw 15 by means of a mechanism for causing rotative movement of the shaft 161 with the drive screw 15 and, at the same time, permitting axial displacement of the shaft 161 relative to the drive screw 15. Such a mechanism may comprise a conventional pin and slot device 162.

The shaft 161 may be coupled to an auxiliary shaft 164 by means of a clutching mechanism, which may include a plate 165, fixedly mounted on the shaft 161, and a plate 166, fixedly mounted on one end of the auxiliary shaft 164. The auxiliary shaft 164 may have a conventional return spring 163 mounted thereon.

The other end of the shaft 164 may have a contacting means fixedly mounted thereon, which may include a plate 168 and a bridging contact 169. The bridging contact 169 may be adapted to pass over and engage a plurality of separate contacts 170 and a continuous ring contact 171 mounted in any suitable manner on a stationary plate 172, as seen in Fig. 4.

The separate contacts 170 may be connected by means of a conducting means 174 to a selector switch 175, which in turn may be connected to a suitable source of potential 176 by means of a conductor 178. Assuming that there are 10 threads per inch on the drive screw 15, there should be preferably twenty contacts 170 on the plate 172, which may be connected by individual conductors in the conductor means 174 to a corresponding group of twenty contacts in the selector means 175. The twenty contacts 170 are uniformly spaced-apart and may each be representative of a step of .005 in.

The ring contact 171 may be connected by a conducting means 180 through a Motor Stop control means 181 to a ground or reference point 182. The control means 181 may be connected by a conductor means 183 to a Start-Stop control means 184 in an energizing circuit 185 for an electric motor 186, which may be of any suitable type, but preferably a conventional braking motor adapted to stop abruptly uopn the opening of its energizing circuit. The energizing circuit 185 for the motor 186 may include two terminals 187 and 188 adapted to be connected to a suitable source of electrical energy.

The Slow Forward control means 148 may be adapted in any suitable manner to control the speed-changing clutch 18 and, when necessary, to reverse the direction of rotation of the drive screw 15, so that the reduced speed of movement is always in the forward direction. The control means 148 may be connected by a conductor means 190 to the speed-changing means 18. The conductor means 190 may also be connected through a conductor means 191 to the locking relay 156. A Reverse control means 192 may be connected by a conducting means 193 to a suitable mechanism 194 for reversing the direction of rotation of the drive screw 15.

The system of Fig. 3 operates in much the same manner as that of Fig. 1. When the selector switches are set for a distance greater than that at which the controlled element is initially positioned and the Start-Stop control means 184 is operated, the motor 186 starts to rotate the drive screw 15 at a predetermined speed, so as to move he carrying means 129 in a forward direction (i. e., left to right).

When the brush contacts 128, 131, 139 and 141 contact the preselected contacts 125, 132, 138 and 142, the Slow Forward control means 189 is energized and operates the speed-changing means 18 to reduce the speed of movement of the controlled element. At the same time, the Slow Forward control means partially enables the locking relay 156.

As the carrying member 129 continues to move to the right at the reduced speed, the brush contact 151 comes in contact with the preselecter 0.1 inch contact 125. Thus the locking relay 156 is energized by the circuit completed from the source 120, the conductor 121, the selector switch 122, the conductor means 124, the selected 0.1 inch contact 125, the brush contact 151, the bridging conductor 154, the brush contact 152, the common contact 150, the conductor 155, the locking relay 156 and the conductor 158 to the ground 149.

The energization of the locking relay 156 in turn energizes the solenoid control means 160, causing the clutch plate 165 to engage the plate 166. The bridging contact 169 starts to move over the contacts 170 and 171 on the stationary plate 172 under the control of drive screw 15. When the bridging contact 169 contacts the preselected contact 170, the Motor Stop control means 181 is energized and operates the Start-Stop means 184 to stop the motor 186.

Conventional holding circuits (not shown) may be utilized in the Slow Forward control means 148, the locking relay 156 and the Motor Stop control means 181, so that continued movement of the carrying member 129, after the initial actuation of these means, does not interfere with the continuance of the operation of the system.

When it is desired to move the controlled element in a backward direction, i. e., to the left, the selectors 122, 135, 145 and 175 are set for the desired position and both the Start-Stop control means 184 and the Reverse control means 192 are actuated. The carrying member 129 now starts to move backwardly.

It will be evident that the brush contact 151 will come in contact with the selected 0.1 inch contact 125, before the brush contact 128. When this contact is made, the energizing circuit for the locking relay 156 is completed. However, the Slow Forward control means 148 has not been previously actuated. Therefore, the locking relay 156 is not partially enabled and cannot operate.

Accordingly, the carrying member 129 continues to move backwardly at the normal high speed. When the brush contacts 128, 131 and 141 contact their respective selected contacts 125, 132 and 142, the Slow Forward control means 148 is actuated. The movement of the carrying member 129 is stopped and reversed, so as to proceed in the forward direction at the reduced speed. The remaining operation is identical with that discussed relative to the normal forward movement.

Let us now consider the possibility that it is necessary to move the controlled element in a forward direction but only by a few thousandths of an inch. If, after setting the selector switch 175 for the new position, the Start-Stop control means 184 is actuated to cause forward movement, the carrying member 129 would start forward at the normal high speed. Since the brush contact 128 is already past the selected 0.1 inch contact 125, the controlled element would continue to move forward at the normal high speed past the desired position.

In order to return the controlled element to the desired position, a reversing means, for example a conventional limit switch 198, may be positioned at the far forward end of the plate 126 or at some other suitable location. The limit switch 198, which is connected through a conductor 199 to the Reverse control means 192, may be adapted to respond to some part of the controlled element or carrying member 129, when at the farthest forward point of their movement, so as to actuate the Reverse control means 192. The controlled element may then move through the previously described backward operation and be brought to the desired position.

This movement to a desired position only a very small distance forward can be achieved much more rapidly by initially operating the system in the backward direction. In this latter case, the carrying member 129 moves backwardly at the normal high speed for a very small distance, until the brush contact 128 contacts the selected 0.1 inch contact 125. The system then operates forwardly at the reduced speed in the usual manner.

Thus novel and improved apparatuses have been provided, in accordance with the invention, for automatically measuring and controlling the precision movement of a controlled element over a preselected distance. It is apparent that this movement may be accomplished with great precision and with great rapidity, while only requiring essentially simple and inexpensive elements.

It will be obvious to those skilled in the art that the above embodiments are meant to be merely exemplary and that they are susceptible of modification and variation within the spirit and scope of the invention. For example, the 1.0 inch contacts 132, and the 10.0 inch contacts 142 of the contact strip 126 may be composed of pluralities of interconnected separate bare conductors appropriately connected to the selector switches 135 and 145, spaced apart at intervals corresponding to the spacing between the 0.1 inch contacts 125, and lying transversely to the direction of travel of the controlled element. The switch plate 31 or the contact strip 126 may be mounted on the controlled element 10 with the groups of brushes 30, 36 and 48 or the carrying member 129 being mounted alongside the path through which the controlled element 10 is moved.

Further, the reference plate 20 might be incorporated in the main portion of the controlled element 10 instead of being attached to the depending portion 19, as shown in the drawings. This might be done in a permanent fashion or in a detachable manner, for example, by the incorporation of an opening in the controlled element, in which a reference plate could be positioned. Also, the reference plate 20 might be completely opaque with portions, corresponding to the slits 21, having a different reflectance than other portions of the plate 20, for directing the light from the lamp 50 to the photoelectric cell 61.

With regard to the number of decade selector switches, it will be apparent that the invention is not limited to the use of any particular number or type of selector switches and that any measuring system other than the disclosed decimal system would be equally applicable.

A conventional braking motor, such as described in relation to Fig. 3, may be substituted for the motor 11 and the electrical brake 16. Also, a Slow Forward control means may be incorporated into the system of Fig. 1. Many other substitutions and interchanges will be evident to those skilled in the art.

In order to increase the rapidity and positiveness of the actuation of the various control means, for example, the locking relay 156 and Slow Forward control means 148, gaseous discharge devices may be utilized.

Still further, a photoelectric means similar to that shown in Fig. 1, could be substituted for the brush contact 151 and its associated circuit in Fig. 3.

Therefore, the invention is deemed to be limited only by the appended claims.

We claim:

1. In an electrical switching apparatus for measuring the distance moved by a controlled element along a predetermined path, the combination of a source of electrical energy, contact bearing means disposed along said predetermined path and adapted to move with said controlled element, said contact bearing means having at least two different denominational groups of spaced stepped contacts disposed coextensively and progressively in the direction of said predetermined path, at least two groups of spaced brush contacts mounted at one location in a line normal to the direction of said predetermined path, each brush contact in each of said groups being adapted to slidably engage a corresponding one of the stepped contacts in said different groups of stepped contacts, selecting means associated with each of said groups of brush contacts for selecting a particular one of the brush contacts in each respective group, an electrically energizable means, and means whereby said electrically energizable means is connected to said source of electrical energy through said selected ones of said brush contacts and their corresponding stepped contacts when said controlled element has moved to the position selected by said selecting means.

2. In an electrical switching apparatus for measuring the distance moved by a controlled element along a predetermined path, the combination of a source of electrical energy, an elongated contact plate adapted to move with said controlled element and having a plurality of groups of stepped contacts coextensively and progressively disposed along the length thereof, a first one of said groups of stepped contacts having at least two contact steps representative respectively of different units in one denominational order, a second one of said groups of stepped contacts having a plurality of connected successive sub-groups of stepped contacts progressively arranged coextensively with different respective ones of the contact steps in said first group of stepped contacts, each of said sub-groups of stepped contacts having contact steps corresponding respectively to different units in a lower denominational order, a plurality of groups of brush contacts associated respectively with different denominational orders and adapted to be brought selectively into electrical communication with said stepped contacts, selecting means associated with each of said groups of brush contacts and individually connected with each of said brush contacts, an electrically energizable means, and means for connecting said electrically energizable means to said source of electrical energy through selected brush contacts when said controlled element is at the position selected by said selecting means.

3. In an electrical switching apparatus for measuring the distance moved by a controlled element along a predetermined path, the combination of a source of electrical energy, an elongated contact plate adapted to be moved with said controlled element and having a plurality of decade groups of stepped contacts coextensively and progressively disposed along the length thereof, a first one of said plurality of groups of stepped contacts having at least two contact steps representative respectively of different units in a first denominational order of the decimal notational system, a second one of said plurality of groups of stepped contacts having a plurality of connected successive sub-groups of stepped contacts progressively arranged coextensively with different respective ones of the contact steps in said first group of stepped contacts, each of said sub-groups of stepped contacts having contact steps corresponding respectively to different units in the next lower denominational order of the decimal notational system, a plurality of decade groups of brush contacts associated respectively with different denominational orders, decade selecting means associated with each of said groups of brush contacts and individually connected with each of said brush contacts, an electrically energizable means, and means for connecting said electrically energizable means to said source of electrical energy through selected brush contacts when said controlled element is at the position selected by said decade selecting means.

4. In electrical switching apparatus for measuring the distance moved by a controlled element along a predetermined path, the combination of a source of electrical energy, a plurality of brush contacts, contact bearing means disposed along said predetermined path and having a plurality of fixed contacts thereon adapted to be placed in electrical communication with said plurality of brush contacts in response to relative movement therebetween, an electrically energizable means, drive means adapted to drive said controlled element selectively at a high or low speed, means for selecting a particular combination of said plurality of brush contacts and said plurality of fixed contacts to cause said drive means to switch from its high speed to its low speed, and follow-up brush contacts displaced rearwardly, with respect to said predetermined path, of said plurality of brush contacts for connecting said electrically energizable means to said source of electrical energy.

5. In electrical switching apparatus for measuring the distance moved by a controlled element along a predetermined path, the combination of a source of electrical energy, a plurality of brush contacts, elongated contact bearing means longitudinally disposed along said predetermined path and having a plurality of groups of fixed contacts corresponding to different denominational orders in a given notational system and spaced coextensively and progressively along the length of said contact bearing means, said fixed contacts being selectively adapted to be placed in electrical communication with said plurality of brush contacts in response to relative movement therebetween, an electrically energizable means, drive means adapted to drive said controlled element selectively at a high or low speed, means for selecting a particular combination of said plurality of fixed contacts including one contact from each of said different denominational orders to cause said drive means to switch from its high speed to its low speed at a predetermined point, and follow-up brush contacts displaced rearwardly of said plurality of brush contacts and including one contact adapted when placed in electrical communication with the selected contact in the lowest denominational order of said fixed contacts to connect said electrically energizable means to said source of electrical energy.

6. In electrical switching apparatus for measuring the distance moved by a controlled element along a predetermined path, the combination of a source of electrical energy, a plurality of brush contacts, elongated contact bearing means longitudinally disposed along said predetermined path and having a plurality of groups of fixed contacts corresponding to different denominational orders in a given notational system and spaced coextensively and progressively along the length of said contact bearing means, said fixed contacts being selectively adapted to be placed in electrical communication with said plurality of brush contacts in response to relative movement therebetween, an electrically energizable means, drive means adapted to drive said controlled element selectively at a high speed in a forward or rearward direction or a low speed in a forward direction, means for selecting a particular combination of said plurality of fixed contacts including one contact from each of said different denominational orders to cause said drive means to switch from its high speed to its low speed at a predetermined point, and follow-up brush contacts displaced rearwardly of said plurality of brush contacts and including one contact adapted when placed in electrical communication with the selected contact in the lowest denominational order of said fixed contacts to connect said electrically energizable means to said source of electrical energy.

References Cited in the file of this patent

UNITED STATES PATENTS

| | | |
|---|---|---|
| 2,085,442 | Newell | June 29, 1937 |
| 2,311,142 | Turrettini | Feb. 16, 1943 |
| 2,672,067 | Hansell | Mar. 16, 1954 |
| 2,710,934 | Senn | June 14, 1955 |
| 2,715,703 | Schuck | Aug. 16, 1955 |
| 2,742,599 | Schweighofer | Apr. 17, 1956 |